(12) United States Patent
Patel et al.

(10) Patent No.: US 11,058,053 B2
(45) Date of Patent: Jul. 13, 2021

(54) BLADE GUARD FOR A ROBOT LAWNMOWER

(71) Applicant: iRobot Corporation, Bedford, MA (US)

(72) Inventors: Shaan Patel, Belle Mead, NJ (US); Brian Doughty, Framingham, MA (US)

(73) Assignee: iRobot Corporation, Bedford, MA (US)

( * ) Notice: Subject to any disclaimer, the term of this patent is extended or adjusted under 35 U.S.C. 154(b) by 250 days.

(21) Appl. No.: 16/369,702

(22) Filed: Mar. 29, 2019

(65) Prior Publication Data

US 2019/0297777 A1    Oct. 3, 2019

Related U.S. Application Data

(60) Provisional application No. 62/650,677, filed on Mar. 30, 2018.

(51) Int. Cl.
*A01D 34/81* (2006.01)
*A01D 34/66* (2006.01)
*A01D 34/82* (2006.01)
*A01D 75/20* (2006.01)
(Continued)

(52) U.S. Cl.
CPC .............. *A01D 34/81* (2013.01); *A01D 34/66* (2013.01); *A01D 34/828* (2013.01); *A01D 75/20* (2013.01); *A01D 34/008* (2013.01); *A01D 2101/00* (2013.01)

(58) Field of Classification Search
CPC ...... A01D 34/81; A01D 34/66; A01D 34/828; A01D 34/008; A01D 75/20; A01D 2101/00
See application file for complete search history.

(56) References Cited

U.S. PATENT DOCUMENTS 2,539,779 A * 1/1951 Grosso ................... A01D 34/63
56/16.6
2,906,082 A * 9/1959 Mathis ................. A01D 34/828
56/320.1
(Continued)

FOREIGN PATENT DOCUMENTS

| CN | 206472500 | 9/2017 |
|---|---|---|
| DE | 202012102637 | 10/2013 |

(Continued)

OTHER PUBLICATIONS

International Search Report and Written Opinion in International Appln. No. PCT/US2019/024893, dated Jun. 21, 2019, 12 pages.
(Continued)

*Primary Examiner* — Abigail A Risic
(74) *Attorney, Agent, or Firm* — Fish & Richardson P.C.

(57) ABSTRACT

An autonomous robot lawnmower includes a blade assembly including blades, a drive system to drive the blades through a cutting area having a cutting width, and a lateral blade guard including at least four bars spaced apart from one another by no less than 1 mm and no more than 15 mm. The at least four bars are positioned between the blades and a mowable area when the robot lawnmower is supported on the mowable area. The at least four bars extend across a portion of the cutting width and extending rearward and forward of the cutting area.

21 Claims, 10 Drawing Sheets

(51) Int. Cl.
*A01D 34/00* (2006.01)
*A01D 101/00* (2006.01)

(56) References Cited

U.S. PATENT DOCUMENTS

| | | | | |
|---|---|---|---|---|
| 2,934,882 | A * | 5/1960 | Kaut, Jr. | A01D 34/828 |
| | | | | 56/320.1 |
| 3,038,289 | A * | 6/1962 | Cross | A01D 75/20 |
| | | | | 56/255 |
| 3,312,049 | A * | 4/1967 | Walker | A01D 34/828 |
| | | | | 56/255 |
| 3,665,693 | A * | 5/1972 | Dacus | A01D 75/20 |
| | | | | 56/320.1 |
| 3,680,294 | A * | 8/1972 | Dacus | A01D 34/828 |
| | | | | 56/255 |
| 4,037,396 | A * | 7/1977 | Buchele | A01D 34/828 |
| | | | | 56/255 |
| 6,269,621 | B1 * | 8/2001 | Fischier | A01D 34/73 |
| | | | | 56/255 |
| 9,380,922 | B2 | 7/2016 | Duffley et al. | |
| 10,542,670 | B2 * | 1/2020 | Cmich | A01D 69/02 |
| 10,575,465 | B2 * | 3/2020 | Ran | A01D 34/84 |
| 2015/0359176 | A1 * | 12/2015 | Little | A01D 34/81 |
| | | | | 56/320.1 |
| 2017/0367257 | A1 * | 12/2017 | Cmich | A01D 34/008 |
| 2018/0001786 | A1 * | 1/2018 | Reynolds | G05D 1/0272 |
| 2019/0223376 | A1 * | 7/2019 | Lee | B25J 13/088 |
| 2019/0387675 | A1 * | 12/2019 | Finlayson | A01D 34/66 |

FOREIGN PATENT DOCUMENTS

| | | |
|---|---|---|
| GB | 2283651 | 5/1995 |
| JP | 2016208950 | 12/2016 |
| WO | WO 2015/184674 | 12/2015 |
| WO | WO-2017063539 A1 * | 4/2017 ........... A01D 34/008 |

OTHER PUBLICATIONS

[No Author Listed], "How to install your Landroid," Worx WR106si Landroid, Jan. 1, 2017, 15 pages.
[No Author Listed], "Original Instructions, Worx WR106si Owner's Manual," Worx Landroid, Jan. 1, 2017, 20 pages.
[No Author Listed], "Quick Start Guide: For RS/MS Models," Robomow Friendly Home, Jan. 1, 2017, 4 pages.
[No Author Listed], "Robomow S Models Operations Manual," Robomow Friendly Home, Jan. 1, 2016, 62 pages.
myrobotcenter.eu [online], "Sale: Worx Landroid WR106SI Robot Lawn Mower—2017 Model—With Free 5-Year Guarantee—Guarantee Period Starts on Jan. 3, 2018," available on or before Nov. 17, 2017, via Internet Archive Wayback Machine URL < https://web.archive.org/web/20171117213924/https://www.myrobotcenter.eu/en/worx-landroid-wr106si>, retrieved on May 4, 2021, URL<https://www.myrobotcenter.eu/en/worx-landroid-wr106si>, 8 pages.
PCT International Preliminary Report on Patentability received for PCT Patent Application No. PCT/US2019/024893, dated Oct. 15, 2020, 7 pages.
usa.robomow.com [online], "Robomow Friendly Home," available on or before Nov. 6, 2017, via Internet Archive Wayback Machine URL<https://web.archive.org/web/20171106000408/https://usa.robomow.com/shop/uncategorized/rs-630-5/>, retrieved on May 4, 2021, URL<https://usa.robomow.com/shop/uncategorized/rs-630-5/>, 23 pages.

* cited by examiner

BLADE GUARD FOR A ROBOT LAWNMOWER

CROSS-REFERENCE TO RELATED APPLICATIONS

This application claims the benefit of U.S. Provisional Application No. 62/650,677, filed on Mar. 30, 2018, the disclosures of which is incorporated by reference in its entirety.

TECHNICAL FIELD

This specification relates to a blade guard for a robot lawnmower.

BACKGROUND

An autonomous robot lawnmower can navigate about an environment to mow a lawn. After a user causes the robot lawnmower to initiate a cutting operation, the robot lawnmower autonomously controls rotation of blades to mow the lawn as the robot lawnmower autonomously navigates about the lawn. The user may manually interact with the robot lawnmower to reposition or to reorient the robot lawnmower.

SUMMARY

In one aspect, an autonomous robot lawnmower includes a blade assembly including blades, a drive system to drive the blades through a cutting area having a cutting width, and a lateral blade guard including at least four bars spaced apart from one another by no less than 1 mm and no more than 15 mm. The at least four bars are positioned between the blades and a mowable area when the robot lawnmower is supported on the mowable area. The at least four bars extend across a portion of the cutting width and extending rearward and forward of the cutting area.

In some implementations, each of the at least four bars includes a front portion, a bottom portion, and a back portion. The bottom portion can be generally parallel to a cutting deck to which the at least four bars are mounted. The front portion and the back portion can be angled toward the bottom portion such that a distance between a top end of the front portion and a top end of the back portion is greater than a distance between a bottom end of the front portion and a bottom end of the back portion. In some implementations, the robot lawnmower includes a cutting deck to which the blade assembly is mounted. The at least four bars of the front portion can be attached to the cutting deck. In some implementations, the at least four bars of the front portion define front facing openings such that grass on the mowable area pass through the front facing openings toward the blades when the robot lawnmower moves in a forward drive direction.

In some implementations, the at least four bars are substantially parallel to one another. In some implementations, the at least four bars are substantially parallel to a forward drive direction of the robot lawnmower. In some implementations, an angle between any two of the at least four bars is no more than 5 degrees.

In some implementations, each of the at least four bars includes a bottom portion parallel to the mowable area, and a rear portion angled upward relative to the bottom portion.

In some implementations, an outermost of the at least four bars is a shortest of the at least four bars, and an innermost of the at least four bars is a longest of the at least four bars.

In some implementations, a width of each of the at least four bars is no greater than 1 mm to 10 mm.

In some implementations, the drive system is configured to rotate the blade assembly to sweep the blades through the cutting area. The cutting area can be defined by a first circumference swept by tips of the blades. Ends of the at least four bars can be positioned along a second circumference offset from the first circumference. In some implementations, a diameter of the second circumference is 3 to 12 cm greater than a diameter of the first circumference swept by the blades.

In some implementations, each of the at least four bars includes a bottom portion parallel to the mowable area, and a front portion connected to the bottom portion. The front portion can be angled upward relative to the bottom portion.

In some implementations, a height between the portion of the blades and a bottom portion of each of the at least four bars is no less than 2 to 14 mm.

In some implementations, a minimum distance between an outer perimeter of the robot lawnmower and the lateral blade guard is no more than 4 cm to 6 cm.

In some implementations, an innermost of the at least four bars is at least 2 to 10 cm from an outer perimeter of the robot lawnmower.

In some implementations, the blade assembly is a first blade assembly and the blades are first blades, the lateral blade guard is a first lateral blade guard, and the robot lawnmower further includes a second blade assembly including second blades and adjacent to the first blade assembly, and a second lateral blade guard positioned below a portion of the second blades closest to an outer perimeter of the robot lawnmower. The second lateral blade guard can include at least four bars spaced apart from one another by no less than 1 mm and no more than 15 mm. The at least four bars can be positioned between the blades and the mowable area when the robot lawnmower is supported on the mowable area. Each of the at least four bars can extend across a portion of a cutting width of the second blades and extending rearward and forward of a cutting area of the second blades. In some implementations, the first lateral blade guard and the second lateral blade guard cover between 10% and 30% of an overall cutting width of the first blade assembly and the second blade assembly. In some implementations, the robot lawnmower further include a central blade guard between the first lateral blade guard and the second lateral blade guard. The central blade guard can be detachably connected to a cutting deck to which the first lateral blade guard and the second lateral blade guard are mounted. In some implementations, the central blade guard can include bars extending along a forward drive direction of the robot lawnmower and transverse bars transverse to the forward drive direction of the robot lawnmower.

Advantages of the foregoing may include, but are not limited to, those described below and herein elsewhere. The blade guard may help a user to avoid contact with the robot lawnmower's blades when the user manually interacts with the robot lawnmower. In particular, the blade guard may prevent hands of the user from contacting the blades. In comparison to a lawnmower without the blade guard, the robot lawnmower, having the blade guard, enables the blades to be positioned more closely to the lateral sides of the robot lawnmower while keeping access to the blades restricted. By being positioned closer to the lateral sides, the blades may cut a relatively greater amount of grass and/or cut grass closer to the side of the robot lawnmower compared to blades that are not positioned as close to the lateral sides.

The blade guard can also prevent the user from contacting the blades without impeding movement of the robot lawnmower across a lawn. Bars of the blade guard are oriented to reduce the amount of resistance against forward movement of the robot lawnmower due to contact between the bars of the blade guard and the lawn, e.g., vegetation on the lawn. As a result, the robot lawnmower's mobility does not suffer significantly compared to blade guard systems that produce a large amount of resistance due to contact with vegetation on the mowable area.

As a passive system to protect a user from contacting blades of the robot lawnmower, the blade guard can be implemented on the robot lawnmower with relatively low cost compared to an active system that requires the robot lawnmower to digitally control the active system. For example, the robot lawnmower does not require a camera, an optical sensor, or other sensor to prevent the user from inadvertently contacting the blades, thus decreasing the cost of the blade guard. Nor does the blade guard need to be connected to electrical systems of the robot lawnmower, or to a controller of the robot lawnmower. The blade guard can also be statically attached to a cutting deck of the robot lawnmower, thereby reducing the amount of maintenance that could be needed for a blade guard that is movable relative to the cutting deck. In addition, by having few moving parts, the blade guard can be added to a robot lawnmower without adding a significant amount to the overall cost of production for the robot lawnmower.

In certain implementations in which the robot lawnmower includes a central blade guard, portions of the blade guards are removable such that a user can easily replace the central blade guard with a new central blade guard after a lifecycle of the central blade guard has been exhausted. The attachment mechanism can be intuitive and easily accessible by the user so that the user does not need to perform complex actions in order to remove and replace the central blade guard.

The details of one or more implementations of the subject matter described in this specification are set forth in the accompanying drawings and the description below. Other potential features, aspects, and advantages will become apparent from the description, the drawings, and the claims.

DETAILED DESCRIPTION

Autonomous robot lawnmowers can reduce the time needed to maintain lawns by autonomously maneuvering about the lawns to mow grass on the lawns. An autonomous robot lawnmower, for example, operates autonomously by navigating about a mowable area such as a lawn to cut grass in a defined area. Between operations to mow the mowable area, the robot lawnmower can autonomously return to a base station to recharge a battery of the robot lawnmower. In some implementations, the robot lawnmower can return to the base station to recharge its battery during an operation to mow the mowable area.

After the autonomously robot lawnmower is provided instructions for autonomous operation, e.g., through user selection, through default factory settings, or other methods of selection, the robot lawnmower can autonomously perform one or more mowing operations at different times, through different portions of a mowable area, and/or through multiple mowable areas. While an autonomous robot lawnmower generally operates autonomously, at times it may be desirable for a user to interact with a robot lawnmower. A user may manually interact with a robot lawnmower, for instance, to pick up the robot lawnmower and reposition the robot lawnmower at a new location on the lawn. During this manual interaction in which the user lifts the robot lawnmower up from the lawn, the user may inadvertently contact devices, e.g., blades, rotating shafts, etc., positioned on an underside of the robot lawnmower and used to perform the operations of the lawn. The examples of blade guards described herein prevent or reduce the likelihood that the user will inadvertently contact the devices on the underside of the robot lawnmower. These examples of blade guards can also enable the blades of the robot lawnmower to be positioned closer to the edge without increasing the likelihood that the user will inadvertently contact these devices.

Figure 1:
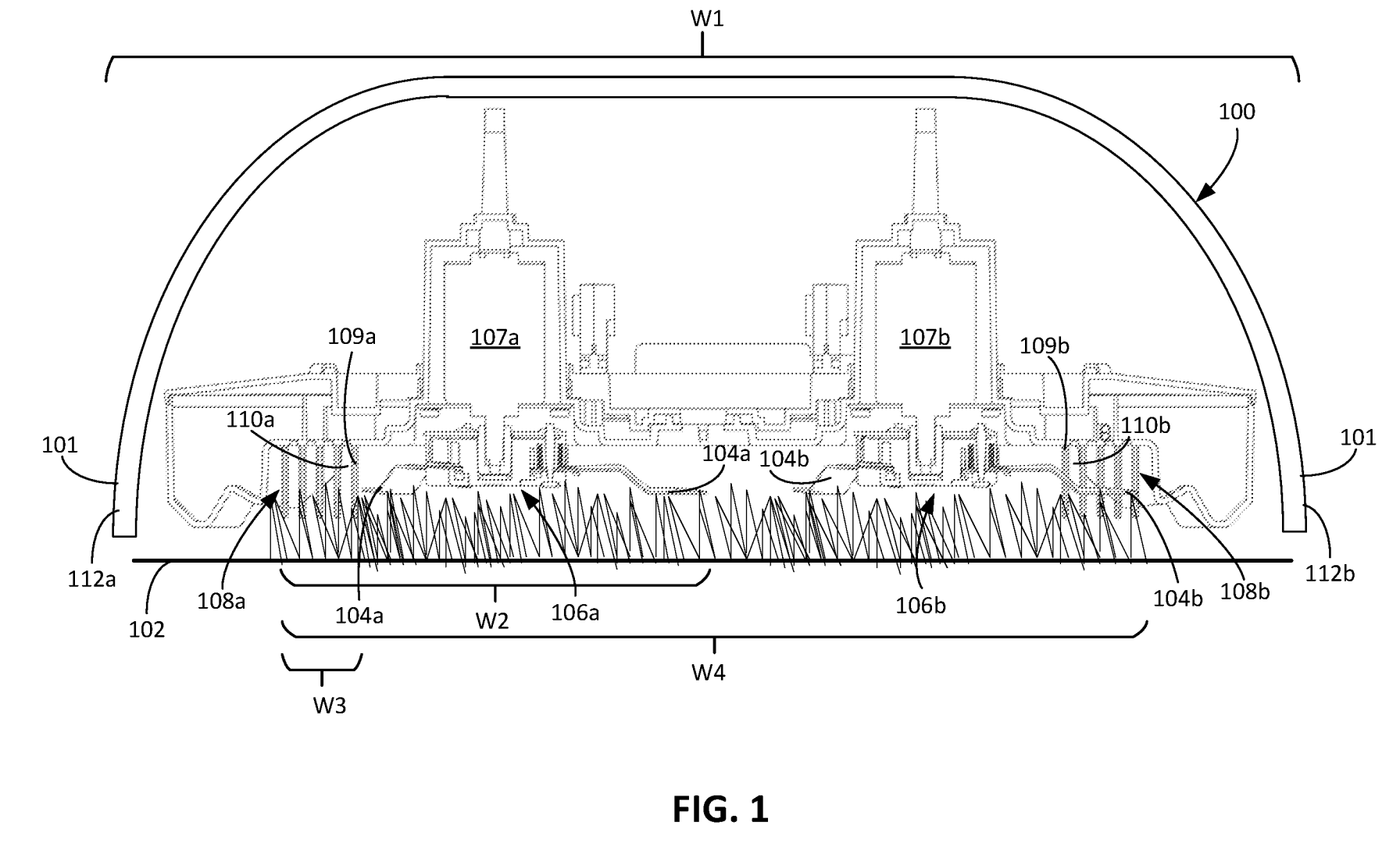
FIG. 1 is a front view of an autonomous robot lawnmower supported on a lawn, the autonomous robot lawnmower including a blade guard.

In the example of FIG. 1, an autonomous robot lawnmower 100 moves across a mowable area 102, e.g., a lawn, to cut grass or other vegetation on the mowable area 102 using blades 104a of a blade assembly 106a. The robot lawnmower 100 includes a blade guard 108a positioned between at least a portion of the blades 104a closest to an outer perimeter 101 of the robot lawnmower 100 and the mowable area 102 when the robot lawnmower 100 is supported on the mowable area 102. The blade guard 108a is a passive blade guard system that prevents the user from inadvertently contacting the blades 104a of the blade assembly 106a when the user manually interacts with the robot lawnmower 100, e.g., lifts the robot lawnmower 100 to move the robot lawnmower 100 from one location to another. As a passive blade guard system, the blade guard 108a is not digitally controlled by a controller, e.g., an electrical controller, of the robot lawnmower 100.

The blade guard 108a includes a grating with openings that allow the blades 104a to access and cut the vegetation on the mowable area 102. The blade guard 108a includes multiple bars 109a that form the grating. The bars 109a are spaced apart from one another and are positioned between the blades 104a and the mowable area 102 when the robot lawnmower 100 is supported on the mowable area 102. In the example shown in FIG. 1, the blade guard 108a includes five bars 109a, but in other implementations, a blade guard can include two bars, three bars, four bars, six bars, or more bars.

The bars 109a define front facing openings 110a through which vegetation on the mowable area 102 passes to enable the blades 104a to cut the vegetation. The bars 109a are arranged such that, during a mowing operation, the vegetation on the mowable area 102 pass through the front facing openings 110a toward the blades 104a when the robot lawnmower 100 moves in a forward drive direction F (shown in FIG. 2). As described herein, although sufficiently large to allow the vegetation to pass through the blade guard 108a, the openings 110a are sufficiently small to inhibit a user from inadvertently contacting the blade assembly 106a or the blades 104a.

In the example shown in FIG. 1, the bars 109a extend laterally across a guard width W3. For example, the guard width W3 corresponds to the distance between an innermost of the bars 109a and an outermost of the bars 109a. The bars 109a hence extend partially across a cutting width W2 of the blade assembly 106a and extend partially across an overall width W1 of the robot lawnmower 100. The guard width W3 is between, for example, 1% and 15% of the overall width W1 (e.g., between 1% and 5%, 5% and 10%, or 10% and 15% of the overall width W1). The guard width W3 is between, for example, 10% and 30% of the cutting width W2 of the robot lawnmower 100 (e.g., between 10% and 20%, 15% and 25%, or 20% and 30% of the cutting width W2).

In some implementations, the robot lawnmower 100 includes a single blade guard 108a, while in other implementations, as shown in FIG. 1, the robot lawnmower 100 includes a second blade guard 108b that includes bars 109b and front facing openings 110b. When the robot lawnmower 100 is supported on the mowable area 102, the second blade guard 108b is positioned between a portion of blades 104b of a second blade assembly 106b closest to the outer perimeter 101 of the robot lawnmower 100 and the mowable area 102. In such implementations, the second blade assembly 106b is adjacent to the first blade assembly 106a, and an overall cutting width W4 of the robot lawnmower 100 is twice the cutting width W2 of an individual blade assembly.

The blade guards 108a, 108b are lateral blade guards. The second blade guard 108b is similar to the first blade guard 108a except that the second blade guard 108b is positioned near a left lateral side 112b of the robot lawnmower 100 whereas the first blade guard 108a is positioned near a right lateral side 112a of the robot lawnmower 100. In this regard, the first blade guard 108a covers a right portion of the overall cutting width W4, and the second blade guard 108b covers a left portion of the overall cutting width W4. The first blade guard 108a and the second blade guard 108b together cover 10% and 30% of the overall cutting width W4 of the robot lawnmower 100 (e.g., between 10% and 20%, 15% and 25%, or 20% and 30% of the cutting width W2), while the first blade guard 108a and the second blade guard 108b individually cover 5% to 15% of the overall cutting width W4 of the robot lawnmower 100 (e.g., between 5% and 10%, 7.5% and 12.5%, or 10% and 15% of the overall cutting width W2).

Figure 2:
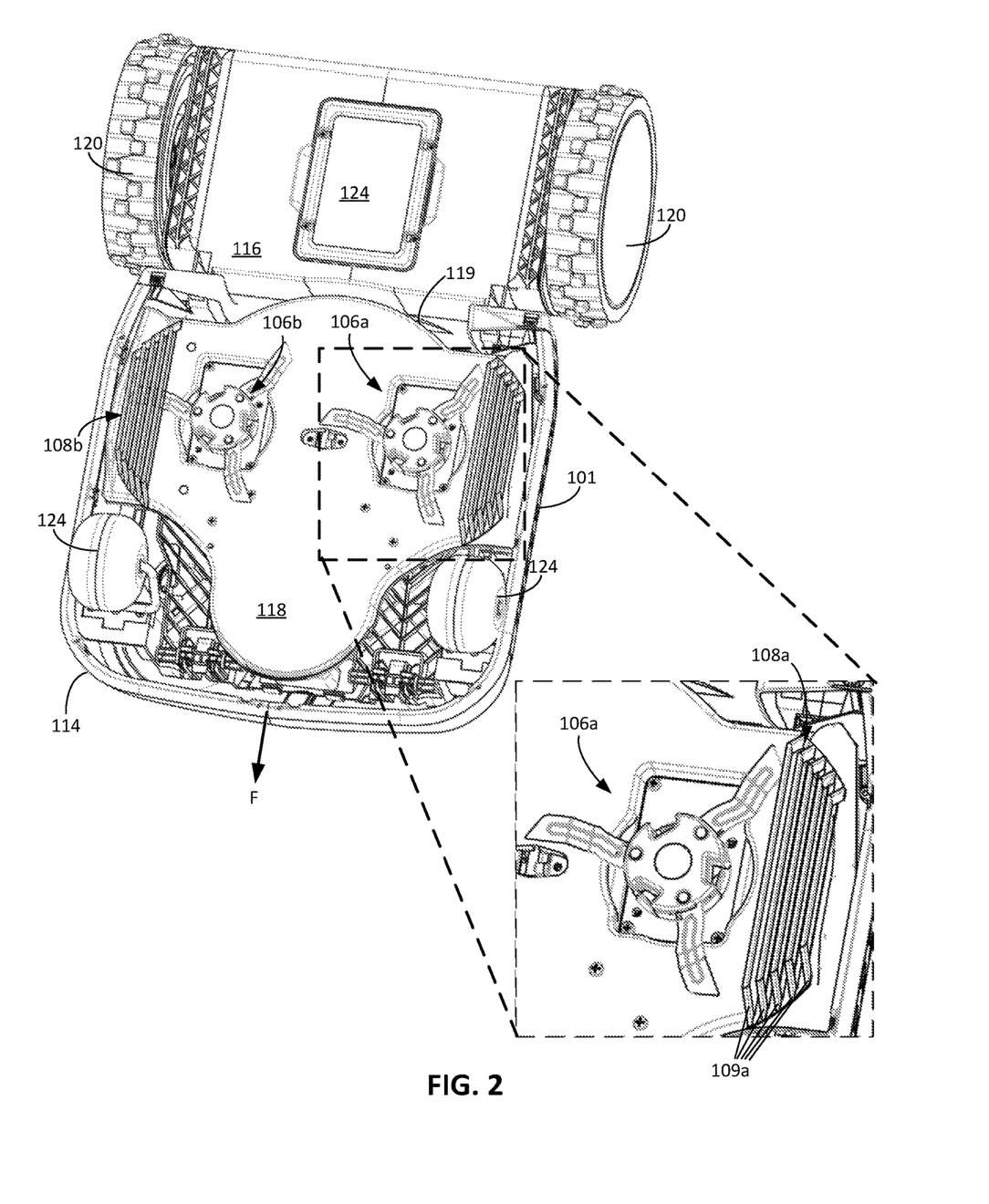
FIG. 2 is a bottom perspective of the autonomous robot lawnmower including the blade guard of FIG. 1.

FIG. 2 shows an example of the robot lawnmower 100. The robot lawnmower 100 includes a bumper 114, a chassis 116, and a cutting deck 118. The bumper 114 defines a front portion of the outer perimeter 101 of the robot lawnmower 100. The bumper 114 is movably mounted to the chassis 116 such that the bumper 114 absorbs the force of impact when the bumper 114 contacts objects on the mowable area 102. The cutting deck 118 carries the blade assemblies 106a, 106b. For example, the blade assemblies 106a, 106b can be fixed to the cutting deck 118, and the cutting deck 118 is movably mounted to the chassis 116. A height of the cutting deck 118 relative to the mowable 102 is adjustable such that a cut height of vegetation of the mowable area 102 can be adjusted.

The robot lawnmower 100 further includes a drive system including drive wheels 120 and one or more motors (not shown) to drive the wheels. The drive wheels 120 and caster wheels 122 support a body of the robot lawnmower 100 (e.g., including the chassis 116, the bumper 114, and the cutting deck 118) above the mowable area 102. The drive wheels 120 are driven by the one or more motors to maneuver the robot lawnmower 100 about the mowable area 102. For example, the robot lawnmower 100 includes a controller (not shown) that operates the one or more motors to selectively drive the drive wheels 120 to navigate the robot lawnmower 100 across the mowable area 102. The controller is configured to receive energy from a battery 124 of the robot lawnmower 100, the battery 124 being positioned rearward of the blade assemblies 106a, 106b.

Figure 3A:
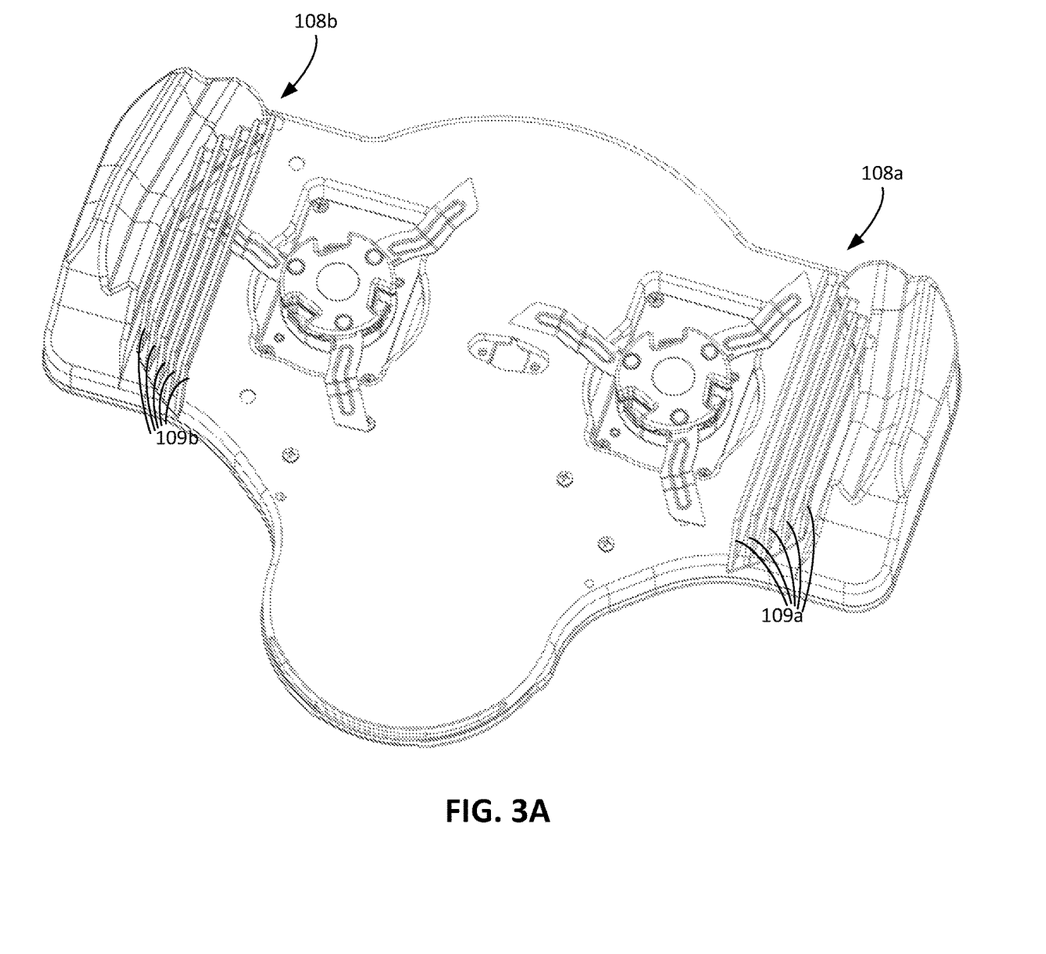
FIGS. 3A, 3C, and 3E are bottom perspective, bottom, and front views of the cutting deck and the blade guard of FIG. 1.
Figure 3B:
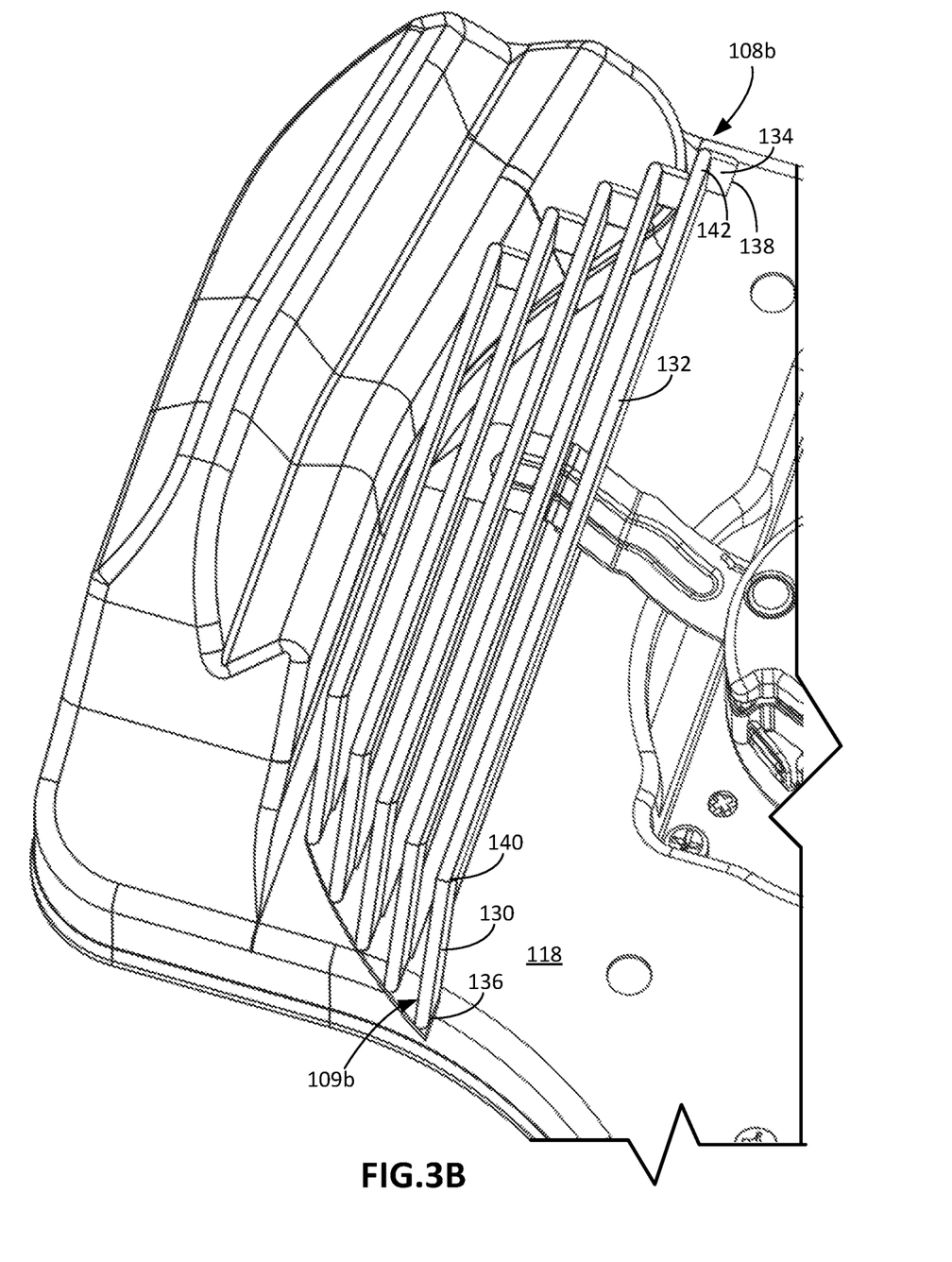
FIG. 3B is a bottom perspective view of a portion of the cutting deck and the blade guard of FIG. 3A.
Figure 3C:
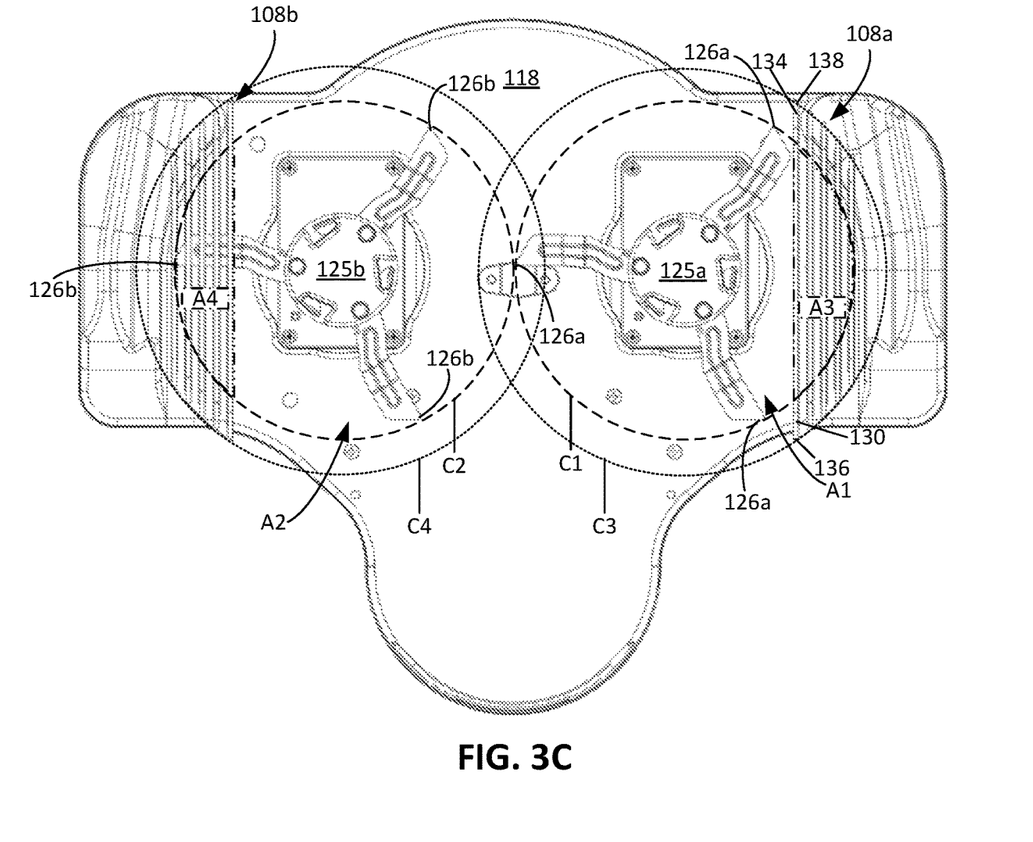

The blade assemblies 106a, 106b are rotatable. For example, motors 107a, 107b (shown in FIG. 1) mounted to the cutting deck 118 are configured to drive hubs 125a, 125b of the blade assemblies 106a, 106b to cause the blade assemblies 106a, 106b to rotate. Referring to FIG. 3C, outer tips 126a of the first blade assembly 106a are swept through a first cutting circumference C1 partially defining a first cutting area A1 when the motor 107a drives the blade assembly 106a. Outer tips 126b of the first blade assembly 106b are swept through a second cutting circumference C2 partially defining a second cutting area A2 when the motor 107b drives the blade assembly 106b. The first cutting area A1 corresponds to the area between the hub 125a of the blade assembly 106a and the first cutting circumference C1, and the second cutting area A2 corresponds to the area between the hub 125b of the blade assembly 106b and the second cutting circumference C2. Each of the diameters of the first and second cutting circumferences C1, C2 are equal to the cutting width W2 of a single one of the blade assemblies 106a, 106b, and the overall cutting width W4 is equal to the sum of the diameters of the first and second cutting circumferences C1, C2. The blades 106a, 106b cut vegetation on the mowable area 102 that is within the first and second cutting areas A1, A2. In this regard, as the robot lawnmower 100 moves across the mowable area 102 in the forward drive direction F, the robot lawnmower 100 cuts a swath of vegetation having a width corresponding to the overall cutting width W4.

Referring back to FIG. 2, the blade guard 108a is positioned proximate the right lateral side 112a of the robot lawnmower 100, and the blade guard 108b is positioned proximate the left lateral side 112b of the robot lawnmower 100. FIGS. 3A-3E show the blade guards 108a, 108b mounted to the cutting deck 118, isolated from the remainder of the robot lawnmower 100. Referring to both FIGS. 2 and 3A, the bars 109a of the blade guard 108a and the bars 109b of the blade guard 108b are attached to the cutting deck 118, e.g., attached to an outer perimeter 119 of the cutting deck 118. In this regard, the blade guards 108a, 108b are positioned below the cutting deck 118. The bars 109a, 109b can be, for example, metallic rods.

As shown in FIG. 2, the blade guards 108a, 108b, by being positioned proximate the lateral sides 112a, 112b and by extending inwardly away from the lateral sides 112a, 112b, can cover portions of the blade assemblies 106a, 106b closest to the outer perimeter 101, and thus can reduce the likelihood that the user inadvertently touches the blade assemblies 106a, 106b when the user manually handles the robot lawnmower 100. A minimum distance between any one of the blade guards 108a, 108b and the outer perimeter 101 is at least 2 cm to 10 cm (e.g., at least 2 cm to 4 cm, 4 cm to 6 cm, 6 cm to 8 cm, or 8 cm to 10 cm). In other words, an outermost of the bars 109a and an outermost of the bars 109b are at least 2 cm to 10 cm from the outer perimeter 101 (e.g., at least 2 cm to 4 cm, 4 cm to 6 cm, 6 cm to 8 cm, or 8 cm to 10 cm from the outer perimeter 101). In the example shown in FIG. 2, the blade guards 108*a*, 108*b* cover only portions of the blades 104*a*, 104*b* of the blade assemblies 106*a*, 106*b*. In this regard, an innermost of the bars 109*a* and an innermost of the bars 109*b* are at least 1 cm to 10 cm from the outer perimeter 101 of the robot lawnmower 100, e.g., at least 1 cm, 3 cm, 5 cm, 7 cm, or 9 cm.

The blade guards 108*a*, 108*b* are both described with respect to FIGS. 1 and 2. Although primarily described with respect to the blade guard 108*b*, any features of the blade guard 108*b* shown in or described with respect to FIGS. 3A-3E are also applicable to the blade guard 108*a*. Referring to FIG. 3B, as described herein, in some implementations, the blade guard 108*b* includes at least four bars, e.g., including the five bars 109*b*. The cross-sectional widths of each of the bars 109*b* is no more than 1 mm to 10 mm, e.g., 1 mm to 3 mm, 3 mm to 5 mm, 3 mm to 7 mm, 5 mm to 7 mm, or 7 mm to 9 mm.

Each of the bars 109*b* includes a front portion 130, a bottom portion 132, and a back portion 134. The front portion 130 is positioned forward of the bottom portion 132 and the back portion 134 and is directly connected to the bottom portion 132. The bottom portion 132 is positioned between the front portion 130 and the back portion 134 and is directly connected to the front portion 130 and the back portion 134. The back portion 134 is positioned rearward of the bottom portion 132 and the front portion 130 and is directly connected to the bottom portion 132. The bottom portion 132 of each of the bars 109, together, form the bottommost portion of the blade guard 108*b*.

The bars 109*b* are substantially parallel to one another. For example, an angle between any two of the bars 109*b* is no more than 5 degrees, e.g., no more than 4 degrees, 3 degrees, 2 degrees, or 1 degree. The bars 109*b* are also substantially parallel to the forward drive direction F (shown in FIG. 2). Bottom portions of the bars 109*b* are substantially parallel to one another, front portions of the bars 109*b* are substantially parallel to one another, and back portions of the bars 109*b* are substantially parallel to one another.

For each of the bars 109*b*, the bottom portion 132 is substantially parallel to a plane extending through and parallel to a bottom surface of the cutting deck 118. The bottom portion 132 is also substantially parallel to the mowable area 102, while the front portion 130 and the back portion 134 form non-zero degree angles with the plane and the mowable area 102. The front portion 130 and the back portion 134 extend away from the plane and are angled toward the bottom portion 132 such that a distance between a top end 136 of the front portion 130 and a top end 138 of the back portion 134 is greater than a distance between a bottom end 140 of the front portion 130 and a bottom end 142 of the back portion 134. The front portion 130 and the back portion 134 are angled upward relative to the bottom portion 132.

An angle between the front portion 130 and the plane through the bottom surface of the cutting deck 118 is between 25 degrees and 75 degrees, e.g., between 25 and 40 degrees, 40 and 60 degrees, or 60 and 75 degrees. In this regard, an angle between the front portion 130 and the bottom portion 132 is between 25 degrees and 75 degrees, e.g., between 25 and 40 degrees, 40 and 60 degrees, or 60 and 75 degrees. An angle between the back portion 134 and the plane is between 25 degrees and 75 degrees, e.g., between 25 and 40 degrees, 40 and 60 degrees, or 60 and 75 degrees. In this regard, an angle between the back portion 134 and the bottom portion 132 is between 25 degrees and 75 degrees, e.g., between 25 and 40 degrees, 40 and 60 degrees, or 60 and 75 degrees. Because the bottom portion 132 is substantially parallel to the plane through the bottom surface of the cutting deck 118, the bottom portion 132 and the plane form an angle that is no more than 5 degrees, e.g., no more than 4 degrees, 3 degrees, 2 degrees, or 1 degree.

Referring to FIG. 3C, the outer tips 126*a* and the outer tips 126*b* are swept through the cutting circumferences C1, C2 that define non-overlapping cutting areas A1, A2. The cutting circumference C1 swept by the outer tips 126*a*, in some implementations, intersects the cutting circumference C2 at a single point. For example, the cutting circumference C1 is tangential to the cutting circumference C2. In other implementations, the cutting circumferences C1, C2 are spaced apart by 1 mm to 5 mm or more, e.g., at least 1 mm, at least 3 mm, at least 5 mm, or more.

Ends of the bars 109*a*, 109*b*, e.g., including the top end 136 of the front portion 130 and the top end 138 of the back portion 134, are positioned along circumferences C3, C4. The circumferences C3, C4 are offset from and larger than the cutting circumferences C1, C2 such that the circumferences C3, C4 encircle the cutting circumferences C1, C2. For each of the bars 109*a*, 109*b*, the top end 136 of the front portion 130 and the top end of the back portion 134 is positioned along the circumference C3 or C4.

In some implementations, a diameter of each of the circumferences C3, C4 is 10% to 30% greater than a diameter of the each of the cutting circumferences C1, C2. In some implementations, the diameter of each of the circumferences C3, C4 is 3 cm to 12 cm greater than the diameter of the each of the cutting circumferences C1, C2, e.g., 3 cm to 6 cm, 5 cm to 7 cm, 7 cm to 9 cm, or 9 cm to 11 cm greater than the diameter of the each of the cutting circumferences C1, C2. With such a configuration, each of the bars 109*a*, 109*b* extend across a portion of the cutting width W4 and extend both rearward and forward of the cutting areas A1, A2. In particular, each of the bars 109*a* of the blade guard 108*a* extend rearward and forward of the cutting area A1 and extend across a portion of the cutting width W2, and each of the bars 109*b* of the blade guard 108*b* extend rearward and forward of the cutting area A2 and extend across a portion of the cutting width of the blade assembly 106*b*. The blade guards 108*a*, 108*b* each cover a portion of their respective cutting areas A1, A2. For example, the blade guards 108*a*, 108*b* cover areas A3, A4 of the cutting areas A1, A2. The areas A3, A4 are between 5% and 45% of the areas A1, A2, e.g., between 5 and 15%, 15% and 30%, or 30% and 45% of the areas A1, A2.

Figure 3D:
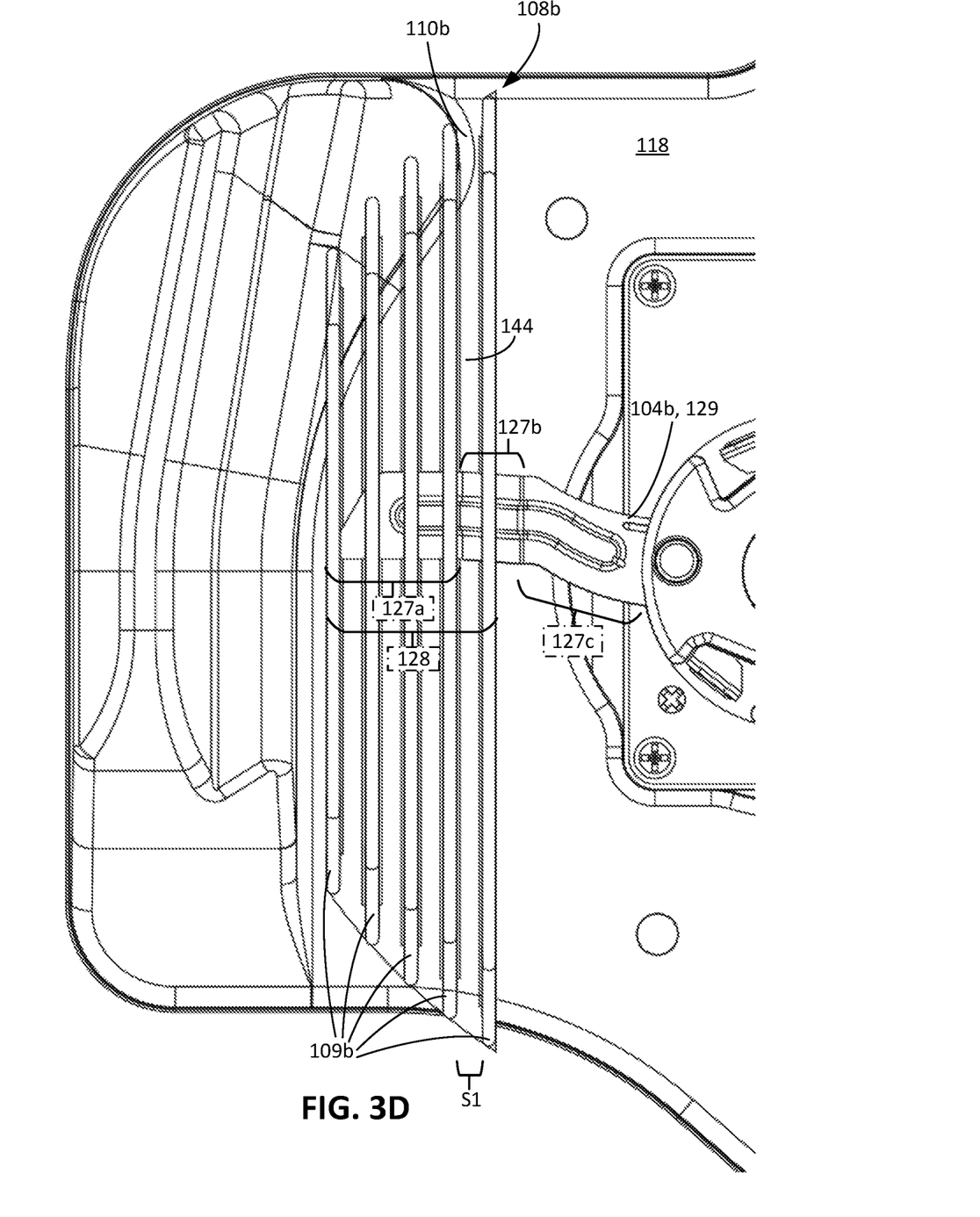
FIG. 3D is a bottom view of a portion of the cutting deck and the blade guard of FIG. 3C.

Referring to FIG. 3D, the blade guard 108*b* covers a portion 128 of the blades 104*b*. The blade guard 108*b* is positioned directly between the portion 128 of the blades 104*b* and the mowable area 102 (shown in FIG. 1) when the robot lawnmower 100 is positioned on the mowable area 102. In particular, the bars 109*b* together, from the innermost of the bars 109*b* to the outermost of the bars 109*a*, cover the portion 128 of the blades 104*b*. The portion 128 of the blades 104*b* is between 40% and 60% of an overall length of one of the blades 104*b* (e.g., between 40% and 50%, 45% and 55%, or 50% and 60% of the overall length of one of the blades 104*b*).

As described herein, the bars 109*b* are spaced apart from one another by a spacing S1. In some implementations, the spacing S1 between the bars 109*b* is no less than 1 mm and no more than 15 mm. The spacing S1, in some implementations, corresponds to the spacing between any two adjacent ones of the bars 109*b*, while in other implementations, the spacing between any two adjacent ones of the bars 109*b* may vary. With this spacing, the bars 109*b* define the front facing openings 110 (shown in FIG. 1) as well as bottom facing openings 144, the bottom facing openings and the front facing openings 110 being connected to one another in some implementations. The bottom facing openings 144 allow vegetation on the mowable area to protrude through the blade guard 108b so that the blades 104b of the blade assembly 106b can cut the vegetation. As the robot lawnmower 100 moves in the forward drive direction F (shown in FIG. 2), the vegetation on the mowable area 102 enters into the cutting areas A2 of the blade assembly 106b through the front facing openings 110. As the robot lawnmower 100 continues to move in the forward drive direction F, the vegetation is allowed to continue to traverse the blade guard 108b through the bottom facing openings 144.

Figure 3E:
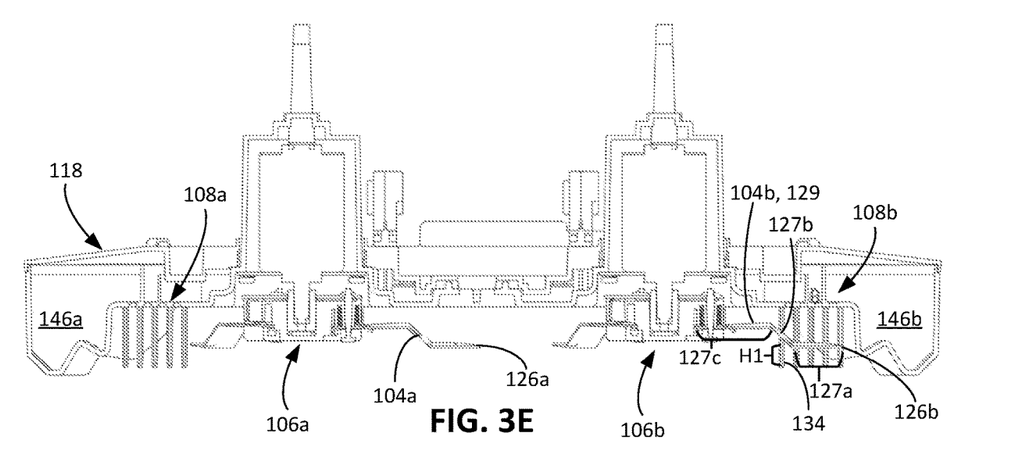

Referring to FIG. 3E, a minimum height H1 between the portion 128 of the blades 108a, 108b and the bottom portion 134 of each of the bars 109a, 109b is no less than 2 to 14 mm, e.g., 2 to 6 mm, 6 to 10 mm, or 10 mm to 14 mm. An overall height H2 of each of the bars 109a, 109b is no less than 5 to 45 mm, e.g., 5 mm to 25 mm, 15 mm to 35 mm, or 25 mm to 45 mm.

Referring to both FIGS. 3D and 3E, the covered portion 128 of the blades 104b includes at least an entire length of a first part 127a of a blade 129 (e.g., one of the blades 104b) and a portion of a second part 127b of the blade 129. The covered portion 128 does not include any of a third part 127c of the blade 129. In some cases, the first part 127a has a sharpened edge to cut vegetation, while the second part 127b and the third part 127c do not include sharpened edges. The second part 127b is tilted upward relative to the first part 127a such that a height of a top portion of the second part 127b from the blade guard 108b is greater than the minimum height H1 between the covered portion 128 of the blades 104b and the blade guard 108b. Because the height of the top portion of the second part 127b and the height of the third part 127c from the blade guard 108b are greater than the first part 127a, the blade guard 108b is positioned directly between only a portion of the second part 127b and the mowable area 102, and is positioned directly between none of the third part 127c and the mowable area 102.

The cutting deck 118 includes overhung portions 146a, 146b positioned directly between the outer tips 126a, 126b of the blades 104a, 104b. The overhung portions 146a, 146b prevent a user from inadvertently contacting the blades 104a, 104b from the side, and the blade guards 108a, 108b prevent a user from reaching around the overhung portions 146a, 146b of the cutting deck 118 and inadvertently contacting the blades 104a, 104b from below.

A number of implementations have been described. Nevertheless, it will be understood that various modifications may be made. For example, referring to FIGS. 4A-4C, in some implementations, an autonomous robot lawnmower includes lateral blade guards 200a, 200b and a central blade guard 202. The lateral blade guards 200a, 200b are similar to the lateral blade guards 108a, 108b described herein. The lateral blade guards 200a, 200b are permanently fixed to a cutting deck 201 of the robot lawnmower.

Figure 4A:
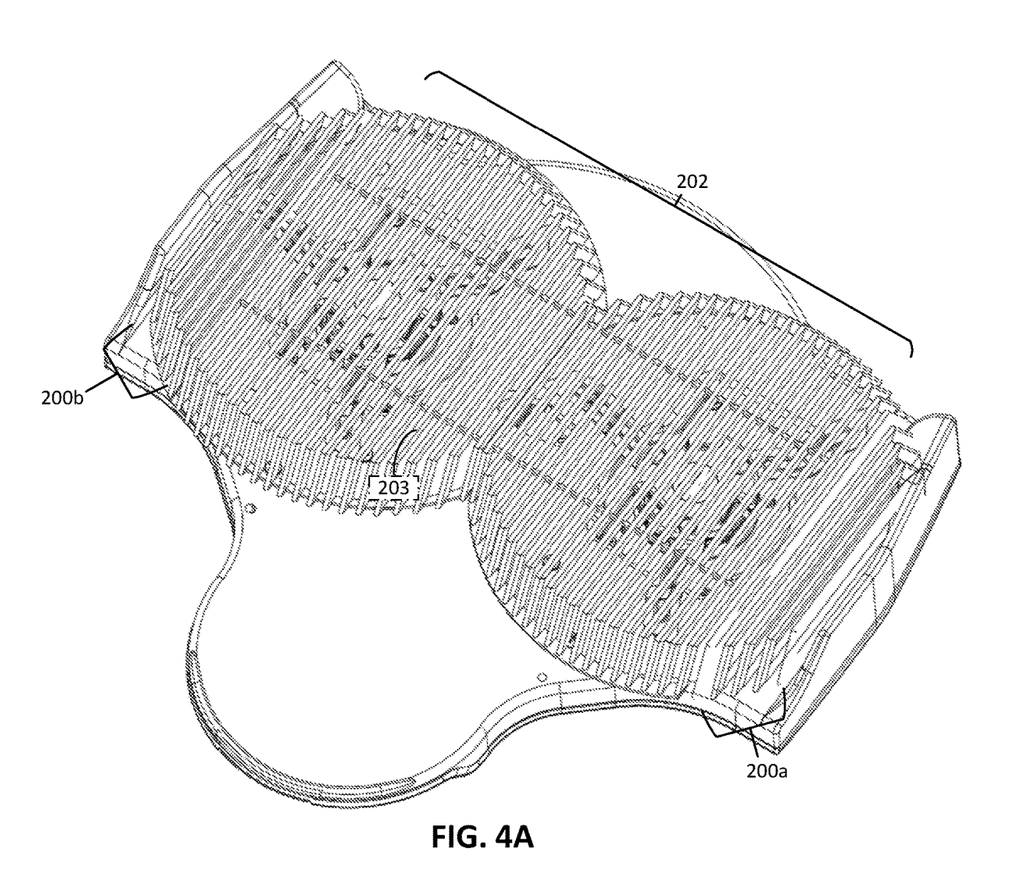
FIGS. 4A, 4B, and 4C are bottom perspective, bottom, and front views of a cutting deck including another example of a blade guard.
Figure 4B:
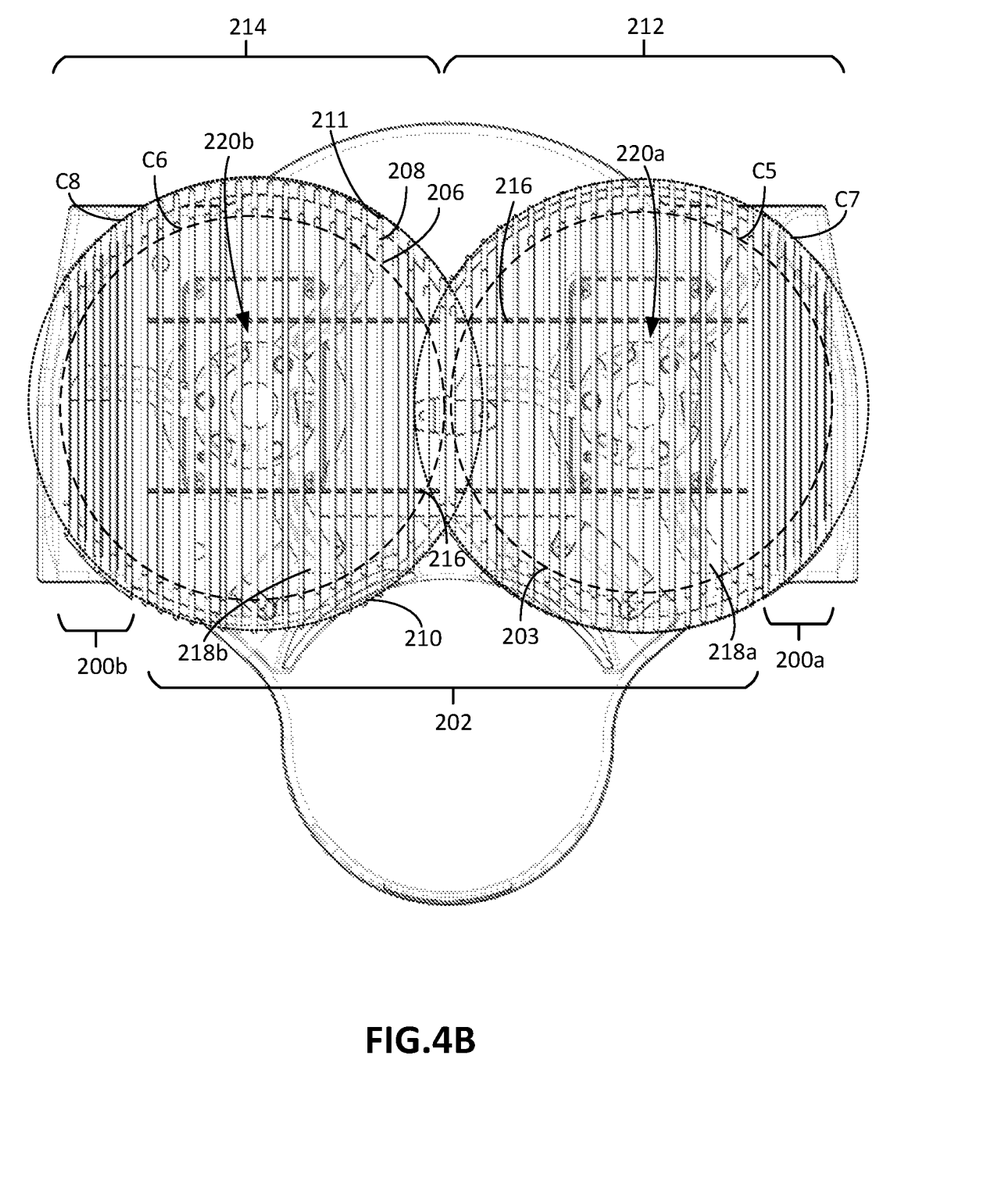
Figure 4C:
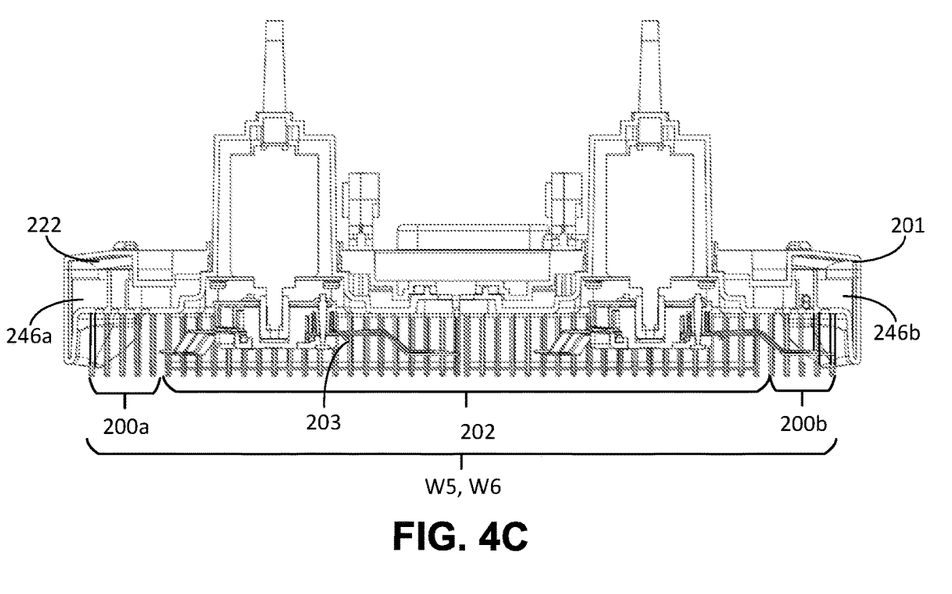

In contrast, the central blade guard 202 is detachably connected to the cutting deck 201 of the robot lawnmower and is positioned between the lateral blade guards 200a, 200b. In some implementations, the central blade guard 202 is detachably connected to the cutting deck 201 through removable screws. In some implementations, the blade guard 202 may require the use of a tool, example removal of screw fasteners, or the blade guard 202 may be removed without a tool, e.g., a snap, latch or other mechanism not requiring any tool.

Like the lateral blade guards 200a, 200b, the central blade guard 202 includes multiple bars 203 that are substantially parallel to one another, substantially parallel to a forward drive direction of the robot lawnmower (e.g., the forward drive direction F), and extend forward and rearward of cutting areas A3, A4 (similar to the cutting areas A3, A4 described herein). The bars 203 are also substantially parallel to the bars of the lateral blade guards 200a, 200b.

Referring to FIG. 4A, the bars 203 each include a front portion 206, a bottom portion 208, and a back portion 208 similar to the front portion 130, bottom portion 132, and the back portion 134 of each of the bars 109a, 109b described herein. Referring to FIG. 4B, for each of the bars 203, a top end 210 of the front portion 206 and a top end 211 of the back portion 208 are positioned along circumferences C7, C8 that are offset from cutting circumferences C5, C6 of blades 218a, 218b of blade assemblies 220a, 220b. The cutting circumferences C5, C6 are similar to the cutting circumferences C1, C2 described with respect to FIG. 3C, and the circumferences C7, C8 are similar to the circumferences C3, C4 described with respect to FIG. 3C. In this regard, top ends of front portions of bars of the lateral blade guards 200a, 200b are positioned along the same circumferences C7, C8 along which the top end 210 and the top end 211 are positioned. In particular, top ends of the bars 203 on a right half 212 of the robot lawnmower are positioned along the circumference C7, and top ends of the bars 203 on a left half 214 of the robot lawnmower are positioned along the circumference C8. The two circumferences C7, C8 together surround the cutting areas A3, A4, and the circumferences C7, C8 together completely enclose the cutting areas A3, A4.

In some implementations, the central blade guard 202 includes transverse bars 216 that are transverse to the bars 203. Whereas the bars 203 are substantially parallel to the forward drive direction of the robot lawnmower, the transverse bars 216 are substantially perpendicular to the forward drive direction of the robot lawnmower. In particular, the transverse bars 216 are substantially perpendicular to the bars 203 and are substantially parallel to one another. For example, the transverse bars 216 and the bars 203 form an angle between 85 degrees and 95 degrees. The transverse bars 216 serve as struts to support the bars 203.

Referring to FIG. 4C, the lateral blade guards 200a, 200b in combination with the central blade guard 202 extend across an overall cutting width W5 of the robot lawnmower. A guard width W6, including a sum of the overall widths of the lateral blade guards 200a, 200b and the central blade guard 202, is substantially equal to or greater than the overall cutting width W5. For example, the guard width W6 is between 95% to 110% of the overall cutting width W5 (e.g., between 95% and 100%, 100% and 105%, or 105% and 110% of the overall cutting width W5). The bars 203 of the central blade guard 202 are positioned a height H2 from the blades 218a, 218b similar to the height H1 described with respect to FIG. 3E.

FIG. 4C further shows overhung portions 246a, 246b of a cutting deck 222. The overhung portions 246a, 246b prevent a user from inadvertently contacting the blades 218a, 218b from the side, and the lateral blade guards 200a, 200b prevent a user from reaching around the overhung portions 246a, 246b of the cutting deck 222 and inadvertently contacting the blades 218a, 218b from below. In some implementations, the overhung portions 246a, 246b are narrower than the overhung portions 146a, 146b shown in FIG. 3E for the cutting deck 118. For example, the overhung portions 246a, 246b have a width between 1 cm and 5 cm, e.g., between 1 cm and 3 cm, 2 cm and 4 cm, or 3 cm and 5 cm.

Other modifications can be possible in addition to or as an alternative to those described with respect to FIGS. 4A-4C. For example, while the blade assemblies 106a, 106b are described as rotatable, in some implementations, an autonomous robot lawnmower includes blade assemblies that are driven to move side-to-side or back-and-forward rather than to rotate. The blades of the blade assemblies are translated by a linear actuator.

The overhung portion 146a, 146b can have a width that varies in certain implementations. For example, the overhung portion 146a, 146b can have a width similar to the width of the overhung portions 246a, 246b. The narrower width can allow an overall width of the robot lawnmower 100 to be smaller, and can allow the overall cutting width W4 extend closer to the outer perimeter 101 of the robot lawnmower 100.

While the robot lawnmower 100 is described as having two blade assemblies 106a, 106b, in other implementations, an autonomous robot lawnmower includes a single blade assembly. If the robot lawnmower includes a single blade assembly, the robot lawnmower could include one or more lateral blade guards and, in some implementations, a central blade guard. In further implementations, the robot lawnmower includes three or more blade assemblies, e.g., four, five, or more blade assemblies. In such implementations, the robot lawnmower can include two lateral blade guards similar to those described with respect to the robot lawnmower 100, and each lateral blade guard inhibits a user from inadvertently contacting blades of multiple blade assemblies.

While the robot lawnmower 100 is described as having multiple blade guards 108a, 108b, in other implementations, an autonomous robot lawnmower includes a single blade guard, e.g., a single lateral blade guard. In other implementations, an autonomous robot lawnmower includes three or more lateral blade guards to prevent inadvertent contact with different portions of the blades of the blade assemblies.

The lateral blade guards 108a, 108b and the central blade guard 202 are described as including bars. While the bars are metallic rods in some implementations, in other implementations, the bars are formed from a polymer, ceramic, or other material.

While described as being permanently attached to the cutting deck 118, the lateral blade guards 108a, 108b in other implementations can be detachably connected to the cutting deck 118. For example, the lateral blade guards 108a, 108b can be attached using screws that are easily accessible to a user who wishes to replace the lateral blade guards 108a, 108b. In some implementations, rather than being mounted on the cutting deck 118, the bars 109a, 109b are directly attached to the bumper 114 or the chassis 116.

Accordingly, other implementations are within the scope of the claims.

What is claimed is:

1. An autonomous robot lawnmower comprising:
a first blade assembly comprising blades;
a second blade assembly comprising blades;
a first drive system to drive the blades of the first blade assembly through a first cutting area, the first cutting area extending across a first portion of a cutting width of the robot lawnmower;
a second drive system to drive the blades of the second blade assembly through a second cutting area, the second cutting area extending across a second portion of the cutting width; and
first and second lateral blade guards, the first lateral blade guard covering the first blade assembly and the second lateral blade guard covering the second blade assembly,
wherein the first lateral blade guard comprises at least four bars spaced apart from one another by no less than 1 mm and no more than 15 mm, the at least four bars positioned between the blades of the first blade assembly and a mowable area when the robot lawnmower is supported on the mowable area, the at least four bars extending at least partially across the first portion of the cutting width and extending rearward and forward of the first cutting area.

2. The robot lawnmower of claim 1, wherein each of the at least four bars comprises a front portion, a bottom portion, and a back portion, the bottom portion being generally parallel to a cutting deck to which the at least four bars are mounted, and the front portion and the back portion angled toward the bottom portion such that a distance between a top end of the front portion and a top end of the back portion is greater than a distance between a bottom end of the front portion and a bottom end of the back portion.

3. The robot lawnmower of claim 2, wherein the front portion of the at least four bars are attached to the cutting deck.

4. The robot lawnmower of claim 2, wherein the at least four bars of the front portion define a plurality of front facing openings such that grass on the mowable area pass through the front facing openings toward the blades of the first blade assembly when the robot lawnmower moves in a forward drive direction.

5. The robot lawnmower of claim 1, wherein the at least four bars are substantially parallel to one another.

6. The robot lawnmower of claim 5, wherein the at least four bars are substantially parallel to a forward drive direction of the robot lawnmower.

7. The robot lawnmower of claim 5, wherein an angle between any two of the at least four bars is no more than 5 degrees.

8. The robot lawnmower of claim 1, wherein each of the at least four bars comprises:
a bottom portion parallel to the mowable area, and
a rear portion angled upward relative to the bottom portion.

9. The robot lawnmower of claim 1, wherein an outermost of the at least four bars is a shortest of the at least four bars, and an innermost of the at least four bars is a longest of the at least four bars.

10. The robot lawnmower of claim 1, wherein a width of each of the at least four bars is no greater than 1 mm to 10 mm.

11. The robot lawnmower of claim 1, wherein:
the first drive system is configured to rotate the first blade assembly to sweep the blades of the first blade assembly through the first cutting area, the first cutting area being defined by a first circumference swept by tips of the blades of the first blade assembly,
wherein ends of the at least four bars are positioned along a second circumference offset from the first circumference.

12. The robot lawnmower of claim 11, wherein a diameter of the second circumference is 3 to 12 cm greater than a diameter of the first circumference swept by the blades of the first blade assembly.

13. The robot lawnmower of claim 1, wherein each of the at least four bars comprises:
 a bottom portion parallel to the mowable area, and
 a front portion connected to the bottom portion, the front portion being angled upward relative to the bottom portion.

14. The robot lawnmower of claim 1, wherein a height between the blades of the first blade assembly and a bottom portion of each of the at least four bars is no less than 2 to 14 mm.

15. The robot lawnmower of claim 1, wherein a minimum distance between an outer perimeter of the robot lawnmower and the first lateral blade guard is no more than 4 cm to 6 cm.

16. The robot lawnmower of claim 1, wherein an innermost of the at least four bars is at least 2 to 10 cm from an outer perimeter of the robot lawnmower.

17. The robot lawnmower of claim 1, wherein:
 the second lateral blade guard comprises at least four bars spaced apart from one another by no less than 1 mm and no more than 15 mm, the at least four bars of the second lateral blade guard positioned between the blades of the second blade assembly and the mowable area when the robot lawnmower is supported on the mowable area, each of the at least four bars of the second lateral blade guard extending across the second portion of the cutting width and extending rearward and forward of the second cutting area of the blades of the second blade assembly.

18. The robot lawnmower of claim 17, wherein the first lateral blade guard and the second lateral blade guard cover between 10% and 30% of the cutting width of the first blade assembly and the second blade assembly.

19. The robot lawnmower of claim 17, further comprising a central blade guard between the first lateral blade guard and the second lateral blade guard, the central blade guard detachably connected to a cutting deck to which the first lateral blade guard and the second lateral blade guard are mounted.

20. The robot lawnmower of claim 19, wherein the central blade guard comprises a plurality of bars extending along a forward drive direction of the robot lawnmower and a plurality of transverse bars transverse to the forward drive direction of the robot lawnmower.

21. The robot lawnmower of claim 1, wherein each of the blades of the first blade assembly and the second blade assembly comprises a sharpened edge, an entirety of the sharpened edge being positionable directly between the first lateral blade guard or the second lateral blade guard and the mowable area.

* * * * *